(12) United States Patent
Belkar et al.

(10) Patent No.: US 12,174,751 B2
(45) Date of Patent: Dec. 24, 2024

(54) METHOD AND SYSTEM FOR DIRECT MEMORY ACCESS

(71) Applicant: HUAWEI TECHNOLOGIES CO., LTD., Shenzhen (CN)

(72) Inventors: Ben-Shahar Belkar, Hod Hasharon (IL); Alex Margolin, Hod Hasharon (IL); Shai Bergman, Munich (DE); Ronen Hyatt, Hod Hasharon (IL); Danny Volkind, Hod Hasharon (IL); Lior Khermosh, Hod Hasharon (IL); Tanya Brokhman, Hod Hasharon (IL)

(73) Assignee: Huawei Technologies Co., Ltd., Shenzhen (CN)

(*) Notice: Subject to any disclaimer, the term of this patent is extended or adjusted under 35 U.S.C. 154(b) by 85 days.

(21) Appl. No.: 18/070,132

(22) Filed: Nov. 28, 2022

(65) Prior Publication Data

US 2023/0161714 A1    May 25, 2023

Related U.S. Application Data

(63) Continuation of application No. PCT/EP2020/064854, filed on May 28, 2020.

(51) Int. Cl.
*G06F 12/1081* (2016.01)
*G06F 12/1009* (2016.01)

(52) U.S. Cl.
CPC ...... *G06F 12/1081* (2013.01); *G06F 12/1009* (2013.01)

(58) Field of Classification Search
CPC ............. G06F 12/1081; G06F 12/1009; G06F 2212/1024; G06F 2212/657; G06F 2212/1016
See application file for complete search history.

(56) References Cited

U.S. PATENT DOCUMENTS 8,244,954 B2    8/2012  Ganesh et al.
10,613,881 B2 *  4/2020  Lee .................. G06F 13/28
(Continued)

FOREIGN PATENT DOCUMENTS

EP    3361387 A1    8/2018

OTHER PUBLICATIONS

Lesokhin et al., "Page fault support for network controllers," ACM SIGOPS Operating Systems Review, Total 18 pages (Jul. 26, 2017).
(Continued)

*Primary Examiner* — Sean D Rossiter
(74) *Attorney, Agent, or Firm* — Leydig, Voit & Mayer, Ltd.

(57) ABSTRACT

A computing system receives a data packet comprising data to be written to the computing system and address data comprising an address in a set of addresses of a first address space of the computing system. An address is determined in a second address space of the computing system identified with the address of the data packet and writing the data to the computing system on the basis of the determination. A first subset and a second subset of the set is identified and the first subset of addresses of the second address space is associated with a region of memory of the computing system and the second subset of addresses of the second address space is associated with a region of a data storage area.

28 Claims, 4 Drawing Sheets

(56) References Cited

U.S. PATENT DOCUMENTS

| | | | |
|---|---|---|---|
| 10,691,365 B1* | 6/2020 | Tsirkin | G06F 12/10 |
| 2009/0150605 A1 | 6/2009 | Flynn et al. | |
| 2014/0122828 A1 | 5/2014 | Kagan et al. | |
| 2015/0242309 A1* | 8/2015 | Talagala | G06F 3/064 |
| | | | 711/103 |
| 2016/0232112 A1* | 8/2016 | Lee | G06F 13/1673 |
| 2016/0350260 A1 | 12/2016 | Tsirkin et al. | |
| 2018/0032279 A1* | 2/2018 | Davis | G06F 3/0689 |
| 2019/0250855 A1* | 8/2019 | Kachare | G06F 3/0658 |
| 2019/0310780 A1* | 10/2019 | Gholamipour | G06F 3/0679 |
| 2020/0371935 A1* | 11/2020 | Chachad | G06F 9/30079 |

OTHER PUBLICATIONS

Amit et al., "vIOMMU: Efficient IOMMU Emulation," USENIX Annual Technical Conference (ATC), Total 14 pages (Jun. 15, 2011).

Tezuka et al., "Pin-down cache: A virtual memory management technique for zero-copy communication," proceedings of the First Merged International Parallel Processing Symposium and Symposium on Parallel and Distributed Processing, Total 7 pages, IEEE, Institute of Electrical and Electronics Engineers, New York, New York (Mar. 30, 1998).

* cited by examiner

METHOD AND SYSTEM FOR DIRECT MEMORY ACCESS

CROSS-REFERENCE TO RELATED APPLICATIONS

This application is a continuation of International Application No. PCT/EP2020/064854, filed on May 28, 2020, the disclosure of which is hereby incorporated by reference in its entirety.

FIELD

The present disclosure relates to a system and method for a computing system. In particular, the present disclosure relates to a system and method for performing direct memory access operations to a computing system.

BACKGROUND

Direct memory access (DMA) allows a device or subsystem in a computing system to directly read and write data into a computing system. DMA may be implemented in a computing system by devices such as the graphical processing units or sound cards or additional processing cores in multicore systems. DMA frees up computational resources in the computing system. In particular DMA operations may be performed while programs run on the main processor, simultaneously.

Remote direct memory access (RDMA) allows one computing system to read or write data to the memory of another computing system across a network. RDMA can improve network performance allowing higher throughput, lower latency networking over systems which do not implement RDMA.

SUMMARY

The present disclosure provides a method for a computing system such as may be used to perform direct memory access operations to a computing system.

Further implementation forms are apparent from the description and the figures.

According to a first aspect, a method for a computing system is provided. The method includes receiving a data packet comprising data to be written to the computing system and address data comprising an address in a set of addresses of a first address space of the computing system, determining, an address in a second address space of the computing system identified with the address of the data packet and writing the data to the computing system on the basis of the determination. A first subset of the set is identified with a first subset of addresses of the second address space and a second subset of the set is identified with a second subset of addresses of the second address space. The first subset of addresses of the second address space is associated with a region of memory of the computing system and the second subset of addresses of the second address space is associated with a region of a data storage area.

The method according to the first aspect provides a method of writing data to a computing system on the basis of a determination of an address in a second address space of the computing system from an address in a first address space. The second address space is partitioned into subsets which include a subset of addresses associated to memory and a subset associated to a region of a data storage area. The data is written to the memory or region of the data storage area in the event that the determined address is in one of those subsets.

According to a second aspect an apparatus for a computing system is provided. The apparatus is arranged to identify an address in a set of addresses in a first address space of a computing system from a data packet comprising data to be written to the computing system and address data comprising the address, determine an address in a second address space of the computing system identified with the address of the data packet and write the data to the computing system on the basis of the determination. A first subset of the set is identified with a first subset of addresses of the second address space and a second subset of the set is identified with a second subset of addresses of the second address space. The first subset of addresses of the second address space is associated with a region of memory of the computing system and the second subset of addresses of the second address space is associated with a region of a data storage area.

In an implementation determining the address in the second address space comprises accessing an address translation table and determining the address on the basis of the address translation table.

In a further implementation the method comprises determining an address from a third subset of addresses in the second address space associated with a region of the data storage area, when the address of the data packet is not identified with an address in the first or second subset of the second address space and writing the data to the region of the data storage area associated to the determined address.

This implementation of the method provides a method of selecting an address from a pool of addresses of the region of the data storage area to map an unmapped address in the first address space In a further implementation the method comprises updating the address translation table to identify the address in the data packet with the determined address from the third subset.

This implementation provides a method of performing a direct memory access for a previously unmapped address to an address in the third subset in a stall-free manner.

In a further implementation the second address space is a physical address space of the computing system.

In a further implementation the first address space is a virtual address space.

In a further implementation determining an address from a third subset of addresses in the second address space comprises accessing stored address data for one or more addresses in the third subset and determining an address in the third subset from the stored address data.

This implementation provides a method of selecting an address from a pool of addresses to map an unmapped address in the first address space to.

In further implementation of the method determining an address from the third subset of addresses in the second address space comprises communicating a request to identify an address from the third subset, to the computing system and receiving a response comprising address data for an address in the third subset from the computing system.

This implementation provides an alternative method for determining an address from a pool of available addresses to map an unmapped address to.

In an implementation the method comprises removing a determined address from the third subset of addresses of the second address space.

The method according to this implementation provides a method of removing addresses from a pool that have been allocated to a previously unmapped address in the first address space.

In a further implementation the method comprises determining a number of addresses of the second address space in the third subset and replenishing the third subset when the number of addresses falls below a threshold number.

This implementation replenishes the pool of addresses to ensure there are enough addresses to withstand numerous requests from unmapped addresses.

In a further implementation replenishing the third subset comprises determining the availability of an address in the second address space on the basis of a criterion and including the address in the third subset on the basis of the determination.

In a further implementation the criterion comprises a criterion of usage of the address by the computing system.

This implementation provides a criterion based on usage of an address for determining the availability of an address for replenishing the pool of addresses. This implementation of the method ensures that addresses which are being underused by the computing system are recycled and used in the pool of available addresses for mapping unmapped addresses.

In a further implementation the address of the data packet is a destination address for a direct memory access (DMA) request.

In a further implementation the data packet is a destination address for a remote direct memory access (RDMA) request.

In a further implementation the method comprises accessing one or more further address translation tables, each table comprising entries for each address in the set; and updating the entries of the one or more further address translation tables corresponding to the address of the data packet to identify the address of the data packet with the determined address.

In a further implementation the address translation table is stored on the computing system.

In a further implementation the address translation table is stored on a device performing a direct memory access or remote direct memory access request to the computing system.

These and other aspects of the present disclosure will be apparent from and the embodiment(s) described below.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION

Figure 1:
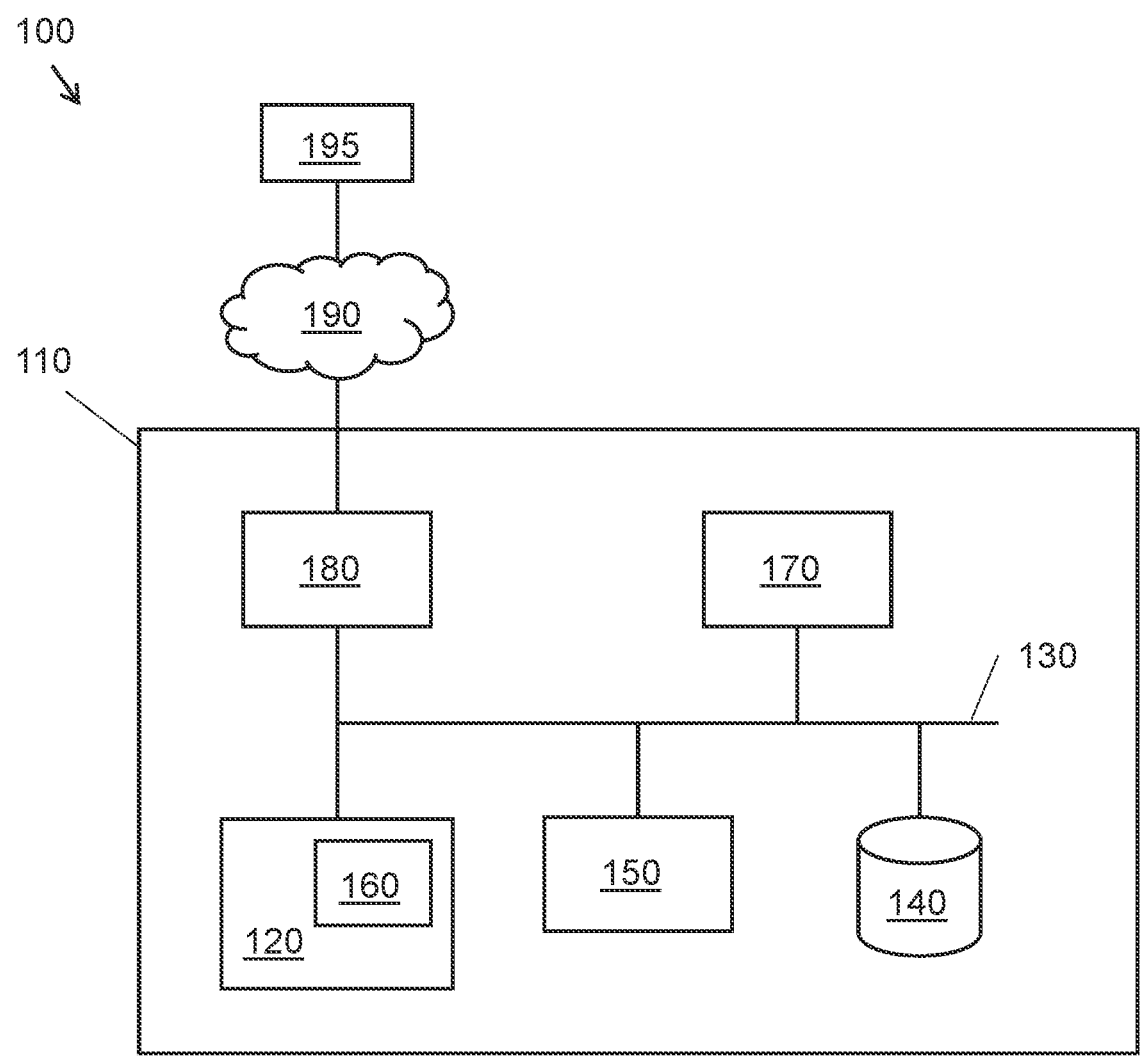
FIG. 1 shows a computing system, according to an example of the present disclosure.

Exemplary embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

FIG. 1 is a block diagram of an apparatus 100. The apparatus 100 comprises a computing system 110. The apparatus 100 may be used with the methods and systems described herein. The computing system 110 comprises a central processing unit (CPU) 120. The CPU 120 comprises logic to read and write data to memory and execute processes on the computing system 110. The CPU 120 is connected to further components of the computing system 110 via a bus 130. The bus 130 facilitates transfer of data between interconnected components of the computing system 110.

The computing system 110 comprises a storage device 140. The storage device 140 may comprise any type of non-transitory storage device configured to store data, programs, and other information and to make the data, programs, and other information accessible via the bus 130. The storage device 140 may comprise, for example, a solid state drive, hard disk drive, a magnetic disk drive, or an optical disk drive. The storage device 140 is connected to other components of the computing system 110 via the bus 130.

The computing system 110 comprises a physical memory 150. The memory 150 may comprise any type of non-transitory system memory such as static random access memory (SRAM), dynamic random access memory (DRAM), synchronous DRAM (SDRAM), read-only memory (ROM), or a combination thereof. The memory 150 comprises a plurality of memory cells. Each memory cell has an address that identifies the location of the memory cell in the memory 150. The range of discrete addresses of the memory 150 is referred to as the physical address space.

In examples described herein the storage device 140 may also be referred to as a swap device. In FIG. 1 the storage device 140 is a physically separate entity to the physical memory 150. In other examples, the function of the storage device 140 as a swap device may be performed by a cache in the physical memory 150 of the computing system 110, or similar. In other examples, a remote storage device that is physically separate from the computing system 110 may perform the equivalent functions of the storage device 140 as a swap device.

Generally, only system software, such as the BIOS, which is executed on start-up, and an operating system, directly accesses the physical memory 150. For other processes, the computing system 110 maintains a virtual address space. The virtual address space is similar to the physical address space however the addresses do not correspond to locations in the physical memory 150. The virtual address space gives the appearance of a contiguous address space to a process. A mapping of virtual addresses to physical address is stored in a data structure called a page table. Each entry of the page table may be referred to as a page table entry. A page, memory page, or virtual page is a fixed-length contiguous block of virtual memory, described by a single page table entry. A frame is a fixed-length contiguous block of physical memory on to which pages are mapped.

As well as providing the appearance of a contiguous address space, virtual addressing also allows creation of virtual partitions of the memory 150 in to two disjointed areas. A first area referred to as kernel space is reserved for protected processes such as the BIOS and operating system. A second area referred to as user space is allocated to other processes. The computing system 110 maintains separation of the kernel space and user space by preventing processes that execute in user space from addressing the kernel space.

The CPU 120 shown in FIG. 1 comprises a memory management unit (MMU) 160. The MMU 160 performs address translations to map virtual addresses of pages that are addressed by a process to the physical address of corresponding frames in the memory 150. The MMU 160 also performs virtual memory management for processes running on the computing system 110. When a page is moved between different physical memory locations the MMU 160 manages the corresponding page table entries, updating the page table as is needed.

Data stored at virtual addresses is moved between the physical memory 150 and other storage such as the storage device 140 using a virtual memory management process called paging. When a process requests a page in the virtual address space, the MMU 160 determines if the requested page is available in the memory 150 by performing an address translation. When the page is available the physical address is returned and the computation executes on the CPU 120. When the page is not available in the memory 150 the MMU 160 returns a page fault. Software running on the operating system, referred to as a paging supervisor, accesses the storage device 140, restores the frame corresponding to the virtual address of the page that caused the page fault and updates the page table in the MMU 160 with the new mapping between the virtual address and the physical address where the page has been restored to in the memory 150.

Paging allows the computing system to allocate a contiguous virtual addresses range to a process that exceeds space available in the physical memory 150 by extending the virtual address space into a secondary storage device such as the storage device 140. However, when all frames are in use in physical memory 150, the operating system selects a frame to reuse for the page that the process requires. The paging supervisor may use a page replacement algorithm such as Least Recently Used (LRU) or First In First Out (FIFO) to determine which memory location in the memory 150 to free up for the requested page. The paging supervisor may page out or "swap out" a page, according to the page replacement algorithm, from the memory 150 to the storage device 140. The paging supervisor updates the page table such that the page requested by the process points to the freed up location in memory. The region of the storage device 140 that is reserved for this purpose is referred to as the swap space. In some instances, pages may be locked or "pinned" in the memory 150 to prevent the page being swapped out to the storage device 140.

The computing system 110 further comprises a direct memory access (DMA) device 170. The DMA device 170 may be a disk drive, a graphics card, sound card or other hardware device. In other examples the DMA device 170 may be a further processing core similar to the CPU 120. The DMA device 170 is connected to the bus 130 and may interact with the other components of the computing system 110 via the bus 130. The DMA device 170 may perform DMA requests to the memory 150. A DMA request to the memory 150 from the device 170 is an operation, such as a data write operation, which is executed directly to a location in the memory 150, independently of the CPU 120. Without DMA, when the CPU 120 is using programmed input/output, it is fully occupied for the entire duration of the read or write operation, and is unavailable to perform other work. DMA allows the CPU 120 to perform other operations while the DMA request originating from the device 170 is being processed. DMA is useful, for example, for performing a large data transfer between the device 170 and memory 150. Once the DMA operation to the memory 150 is complete, the device 170 sends an interrupt request back to the CPU 120, allowing it to process data from the device 170 that is written to the memory 150 following the DMA operation.

Similarly to processes which run on the computing system 110, DMA requests originating from the DMA device 170 may specify addresses from a virtual address space. In some examples, the DMA device 170 is arranged to perform address translation of addresses specified in DMA requests. For example, in some cases the DMA device 170 and/or computing system 110 include an input—output memory management unit (IOMMU) which performs address translation for I/O device in the computing system 110 in a manner similar to how the MMU 160 performs address translation for the CPU 120. In other examples, the DMA device 170 tracks or queries page table entries using a remote procedure call to the operating system.

The computing system 110 further comprises a network interface controller (NIC) 180 that connects the computing system 110 to a network 190. The NIC 180 may comprise a wired or wireless link to the network 190 e.g. Ethernet or a wireless transmitter and receiver. In some examples, the network 190 may be a local area network (LAN). In other examples, the network 190 is a wide area network. The network 190 facilitates communication between the computing system 110 and remote devices, such as other computing systems, web servers and remote storage and data processing facilities.

In FIG. 1, the computing system 110 is in communication with a remote computing device 195 across the network 190. According to examples, the NIC 180 supports remote direct memory access (RDMA) requests from the remote device 195 to the memory 150. Similarly to a DMA request from the DMA device 170, a RDMA request originating for the remote device 195 is a request to perform an operation direct to a location in the memory 150, which by-passes the operating system of the computing system 110. RDMA permits high-throughput, low-latency networking between the computing system 110 and remote device 195 by enabling zero-copy of data to the memory 150 without the CPU 120 having to perform any copying of the data to further memory locations.

Similarly to processes which run on the computing system 110 and DMA requests originating from the DMA device 170, RDMA requests that are received at the NIC 180 may include an address from a virtual address space. In some examples, the NIC 180 is arranged to perform address translation of addresses specified in RDMA requests. In other examples, the NIC 180 tracks or queries page table entries using, for example, an on board IOMMU. Once the physical address is determined the NIC 180 can write the data in the RDMA request directly in to the memory 150.

The methods and systems described herein may be used to perform a DMA (or RDMA) to the storage device 140, for a DMA request that is destined for an unmapped virtual address that does not have a corresponding physical address in the memory 150.

One method of addressing the problem of a (R)DMA request targeting an unmapped virtual address is to pin a subset virtual addresses that may be used by the DMA device 170 or NIC 180 to physical addresses in the memory 150. This ensures that (R)DMA operations never encounter unmapped memory. However, there is a considerable price to pay as the pinned memory is unavailable for use by other processes or devices in the computing system 120. Furthermore, the memory consumption in this case can impair performance as other memory has to be swapped out from the memory 150 to the storage device 140 more frequently to accommodate the required space.

An alternative to permanently allocating memory to DMA operations using pinning is to provide temporarily pinned buffers in the memory 150 which serve as the destination for DMA operations. Each buffer may be re-used once the last DMA request has been completed. For example, incoming data from a RDMA request originating from the device 195 may first be placed in a pinned buffer in the memory 150 and then copied to a further buffer in the subspace of a virtual address space that is addressed by a process. Then the original pinned buffer is free for re-use in further DMA request.

Unfortunately, this method similarly suffers a number of disadvantages. Firstly, there is a considerable latency decrease because of the additional copy operation from the pinned buffer. In such embodiments, the buffer is not available for further DMA requests. This also requires the allocation of a dedicated pinned buffer pool which incurs a management overhead in the computing system 110, similar to the previously described pinning method. Other methods similarly suffer latency penalties or incur large memory footprints due to excessive pinning of regions of the memory 150.

In the methods and systems described herein (R)DMA operations to unmapped virtual addresses are not stalled, and are not transferred into a location in the memory 150. Instead the the (R)DMA operations are served by the swap space in the storage device 140. If a virtual address has a corresponding swap slot in the swap space of the storage device 140, the data is written directly to the slot overwriting any previous data in the slot. Otherwise, the request is served by a pool of buffers with addresses in the swap space. The pool of addresses serve (R)DMA requests that are destined for unmapped memory without a corresponding swap slot. Serving the request does not require any operation to be performed by the CPU 120 and do not require the data to pass through the memory 150.

Figure 2A:
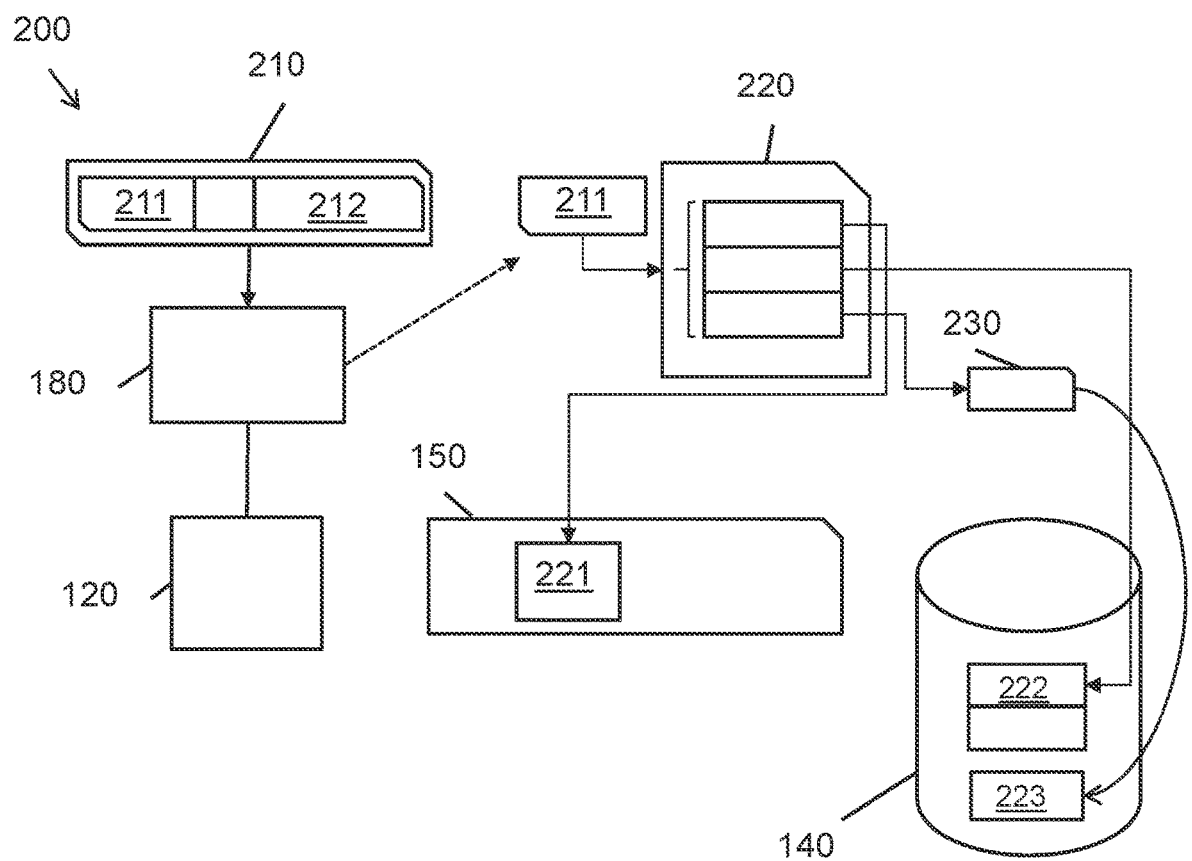
FIG. 2A is a schematic diagram showing a remote direct memory access request, according to an example of the present disclosure.

FIG. 2A is a simplified diagram showing an example 200 of a RDMA request according to the methods described herein. The example 200 shown in FIG. 2A is for a RDMA request processed by the NIC 180 shown in FIG. 1. A DMA request that originates at the DMA device 170 shown in FIG. 1 is processed in a similar manner and the example shown in FIG. 2A is not intended to limit the other methods and examples described herein to RDMA requests.

In the example 200 shown in FIG. 2A the RDMA request 210 is received at the NIC 180 shown in FIG. 1. The RDMA request 210 may be received from e.g. the remote device 195 shown in FIG. 1. The RDMA request 210 comprises a destination (virtual) address 211 which is an address in a virtual address space of e.g. a targeted process running on the computing system 110, and data 212 to be written to the computing system 110. In some cases, the data 212 may be partitioned into one or more data packets where the virtual addresses of respective data packets are determined by an offset from the virtual address of the first packet, which is indicated as the virtual address 211 of the RDMA request 210. When the RDMA request 210 is received by the NIC 180, the NIC 180 performs address translation (either itself, or using e.g. an on board IOMMU, as previously described) to identify an address in the memory 150 for the destination virtual address 211.

Examples of translations of the destination address 211 are shown in the box 220. Three separate examples are shown. When the virtual address 211 of the RDMA request is already mapped in memory 150 the NIC 180 simply performs the address translation and writes the data 212 to the corresponding location in memory 150. For example, in FIG. 2A, if the virtual address 211 maps to the physical address 221, the NIC 180 writes the data 212 to the location 221 in the memory 150. If the NIC 180 determines that the page of the destination address 211 is not present in the memory 150 but is already allocated a swap slot at an address 222 in the swap space on the storage device 140, then the NIC 180 writes the data 212 to the slot 222. If the NIC 180 determines that the address 211 is not mapped to any address either in the physical memory 150 or in the swap space in the storage device 140, then the NIC 180 writes the data 212 to a temporary swap space buffer 230, which points to an address 223, selected from a pool of available addresses, in the swap space of the storage device 140 and interrupts the CPU 120 to re-map to the swap space buffer 230.

Figure 2B:
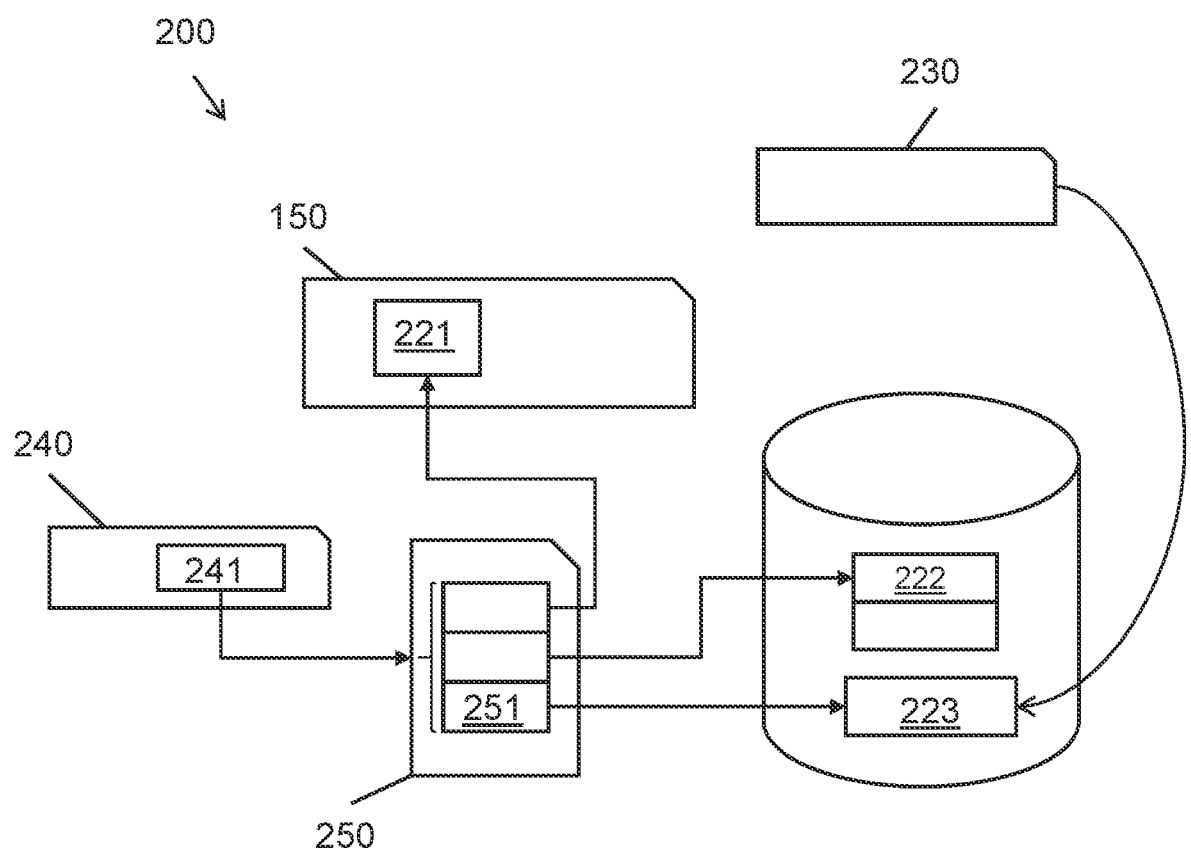
FIG. 2B is a schematic diagram showing a remote direct memory access request, according to an example of the present disclosure.

FIG. 2B shows the same example 200 as shown in FIG. 2A. In FIG. 2B the virtual address space 240 and a process 241 which addresses a range of address in the virtual address space 240 is shown. In the event that the virtual address targeted by the RDMA request is unmapped, once the NIC 180 has determined the address 223 of the swap slot to write the data 212 of the RDMA request 210 to, the NIC 180 notifies the CPU 120 to update the address translation table 250 for the process 241, such that the entry 251 of the address table points to the swap buffer 223. The CPU 120 (re)maps the virtual address in the address translation table 250 of the process 241 to point to the buffer 230.

Figure 3:
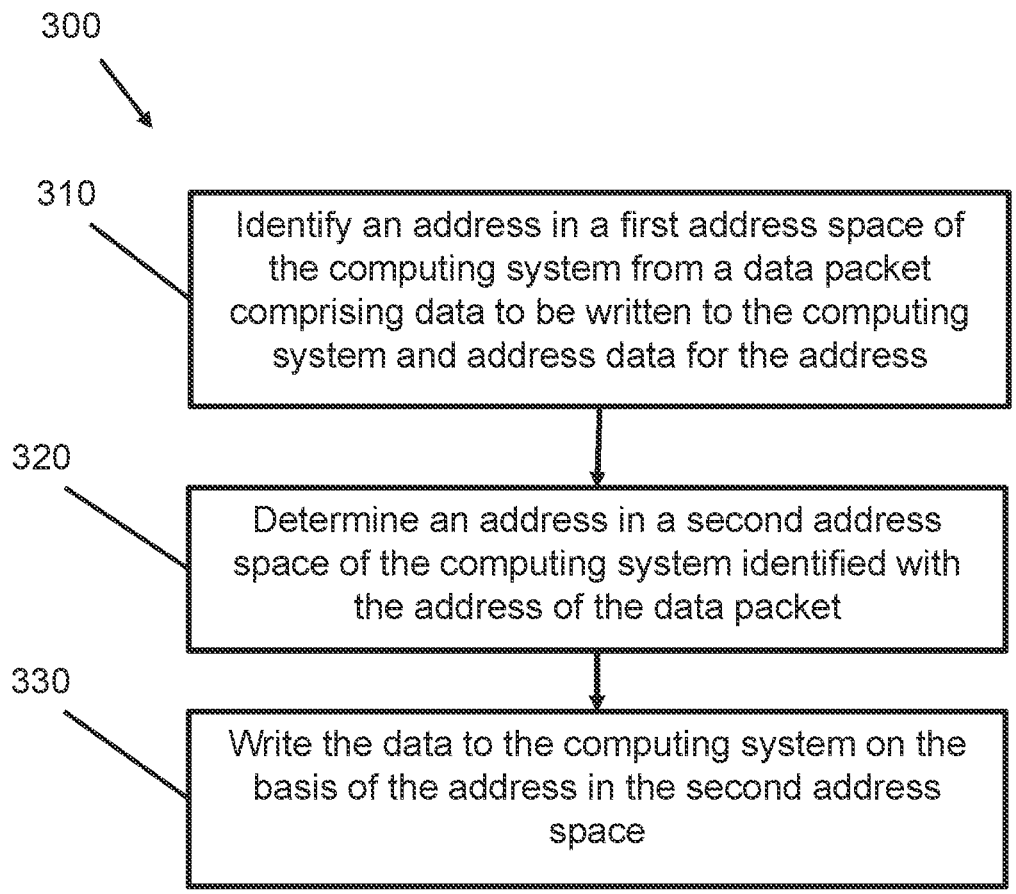
FIG. 3 shows a flow diagram of a method for a computing system, according to an example of the present disclosure.

FIG. 3 is a block diagram showing a method 300 according to an example. The method 300 shown in FIG. 3 may be used in conjunction with other methods and systems described herein. In particular the method 300 may be implemented on the computing system 110 shown in FIG. 1 to process DMA and RDMA requests to the memory 150.

At block 310 a data packet comprising data to be written to the computing system and address data comprising an address in a set of addresses of a first address space of the computing system is received. According to examples, the data packet may be a data packet of a DMA request or an RDMA request. The computing system may be the computing system 110 shown in FIG. 1. According to examples the first address space is a virtual address space of the computing system.

At block 320, a determination is made of an address in a second address space of the computing system identified with the address of the data packet. In some examples described herein the determination is made on the basis of an address translation table that identifies a first subset of the set with a first subset of addresses of the second address space and a second subset of the set with a second subset of addresses of the second address space. The first subset of addresses of the second address space is associated with a region of memory of the computing system and the second subset of addresses of the second address space is associated with a region of a data storage area. In examples, the memory and data storage area may be the memory 150 and storage device 140 shown in FIG. 1.

At block 330, the data is written to the computing system on the basis of the determination. In examples, when the address of the data packet is not identified with an address in the first or second subset of the second address space, the method 300 comprises determining an address from a third subset of addresses in the second address space associated with a region of the data storage area writing the data to the region of the data storage area associated to the determined address. In examples, the method 300 comprises updating the address translation table to identify the address in the data packet with the determined address.

Determining an address from the third subset of addresses may comprise accessing stored address data for one or more addresses in the third subset and determining an address in the third subset from the stored address data. For example, when the method 300 is implemented on the computing system 110 shown in FIG. 1, the NIC 180 may store a pool of addresses which are used to as "swap buffers" for data of an RDMA request to in the event that the request comprises an unmapped virtual address.

In some cases, determining an address from the third subset comprises communicating a query comprising a request to identify an address from the third subset receiving a response comprising address data for an address in the third susbet from the computing system. For example, the NIC 180 may determine the swap buffer address from an IOMMU rather than storing the addresses locally.

In some examples, the method 300 further comprises removing a determined address from the third subset of addresses. The method 300 may also comprise. determining a number of addresses of the second address space in the third subset and replenishing the third subset when the number of addresses falls below a threshold number. Replenishing the third subset may comprise determining the availability of an address in the second address space on the basis of a criterion and including the address in the further subset on the basis of the determination. According to examples, the criterion may comprise a criterion of usage of the address by the computing system. These examples allow the computing system to maintain a supply of swap buffers to write data from DMA requests into the system on demand in a stall-free manner without copying data to a further buffer.

The methods and examples described herein serve DMA operations to unmapped memory without incurring delays due to paging requests. Such DMA operations result in data being stored either directly to their swap slot in the storage device 140, or to a location in a swap buffer. DMA to the storage device, whether a swap slot is mapped to the targeted virutal address or not, is done by the (R)DMA device and does not require any action to be taken by the host computing system. This further eliminates redundant swap operations from the storage device. DMA operations instigated by an independent device do not need to be stalled or halted. The instigating device thus does not need to support data stalling or halting due to the receiver side's constraints. Control packets on RDMA capable networks are reduced due to the redundancy of halt and throttle commands that used to result from receive-side stalls. The methods and system herein also eliminate the need to allocate new pages for DMA operations, since the DMA operation does not require physical memory. Since no new page allocations are needed, the operating system does not need to perform page frame reclaim operations since the number of free pages in the system has not decreased.

It should be appreciated that one or more steps of the embodiment methods provided herein may be performed by corresponding units or modules. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

What is claimed is:

1. A method comprising:
   receiving a data packet comprising data to be written to a computing system and address data comprising a first address in a set of addresses of a first address space of the computing system;
   determining, a second address in a second address space of the computing system identified with the first address of the data packet; and
   writing the data to the computing system based on the determination;
   wherein a first subset of the set of addresses of the first address space is identified with a first subset of addresses of the second address space and a second subset of the set of addresses of the first address space is identified with a second subset of addresses of the second address space; and
   wherein the first subset of addresses of the second address space is associated with a region of memory of the computing system and the second subset of addresses of the second address space is associated with a region of a data storage area;
   determining a third address from a third subset of addresses in the second address space associated with a different region of the data storage area, when the first address is not identified with an address in the first or second subset of addresses of the second address space; and writing the data to the different region of the data storage area associated to the third address, wherein determining the third address from the third subset comprises:

communicating a request to identify an address from the third subset;

receiving a response comprising address data for the third address in the third subset from the computing system.

2. The method of claim 1, wherein determining the second address in the second address space comprises:

accessing an address translation table; and determining the second address based on the address translation table.

3. The method of claim 2, further comprising updating the address translation table to identify the first address in the data packet with the second address.

4. The method of claim 1, wherein the second address space is a physical address space.

5. The method of claim 1, wherein the first address space is a virtual address space.

6. The method of claim 1, wherein determining the third address from the third subset of addresses comprises:

accessing stored address data for one or more addresses in the third subset; and determining the third address in the third subset from the stored address data.

7. The method of claim 1, further comprising removing the third address from the third subset.

8. The method of claim 1, the method further comprising:

determining a number of addresses of the second address space in the third subset; and replenishing the third subset when the determined number of addresses falls below a threshold number.

9. The method of claim 8, wherein replenishing the third subset comprises:

determining the availability of an address in the second address space based on a criterion; and including the address in the third subset based on the determination.

10. The method of claim 9, wherein the criterion comprises a measured usage of the address by the computing system.

11. The method of claim 1, wherein the first address of the data packet is a destination address for a direct memory access (DMA) request.

12. The method of claim 1, wherein the first address of the data packet is a destination address for a remote direct memory access (RDMA) request.

13. The method of claim 2, the method further comprising:

accessing one or more further address translation tables, each table comprising entries for each address in the set; and updating the entries of the one or more further address translation tables corresponding to the first address of the data packet to identify the first address of the data packet with the second address.

14. The method of claim 2, wherein the address translation table is stored on the computing system.

15. The method of claim 2, wherein the address translation table is stored on a device performing a direct memory access or remote direct memory access request to the computing system.

16. An apparatus for a computing system, the apparatus comprising at least one processor configured to:

identify a first address in a set of addresses of a first address space of a computing system from a data packet comprising data to be written to the computing system and address data comprising the first address, determine, a second address in a second address space of the computing system identified with the first address of the data packet; and write the data to the computing system on the basis of the determination, wherein a first subset of the set of addresses of the first address space is identified with a first subset of addresses of the second address space and a second subset of the set of addresses of the first address space is identified with a second subset of addresses of the second address space;

wherein the first subset of addresses of the second address space is associated with a region of memory of the computing system and the second subset of addresses of the second address space is associated with a region of a data storage area;

determine a third address from a third subset of addresses in the second address space associated with a different region of the data storage area, when the first address is not identified with an address in the first or second subset of addresses of the second address space;

write the data to the different region of the data storage area associated to the third address;

communicate a request to identify an address from the third subset, to the computing system; and receive a response comprising address data for the third address in the third subset from the computing system.

17. The apparatus of claim 16, wherein determining the address in the second address space comprises:

arranging the apparatus to access an address translation table and determine the second address based on the address translation table.

18. The apparatus of claim 17, wherein the at least one processor is further configured to update the address translation table to identify the address in the data packet with the determined address.

19. The apparatus of claim 16, wherein the second address space is a physical address space of the computing system.

20. The apparatus of claim 16, wherein the first address space is a virtual address space of the computing system.

21. The apparatus of claim 16, wherein the at least one processor is further configured to:

store address data for one or more addresses in the third subset; and determine the third address in the third subset from the stored address data.

22. The apparatus of claim 16, wherein the at least one processor is further configured to:

communicate a message to the computing system to remove the third address from the third subset.

23. The apparatus of claim 16, wherein the at least one processor is further configured to:

determine a number of addresses of the in the third subset; and update the third subset with one or more addresses when the number of addresses falls below a threshold number.

24. The apparatus of claim 16, wherein the first address of the data packet is a destination address for a direct memory access (DMA) request to the memory of the computing system.

25. The apparatus of claim 16, wherein the first address of the data packet is a destination address for a remote direct memory access (RDMA) request to the memory of the computing system.

26. The apparatus of claim 17, wherein the at least one processor is further configured to:
   access one or more further address translation tables, each table comprising entries for each address in the set; and
   update the entries of the one or more further address translation tables corresponding to the address of the data packet to identify the first address of the data packet with the second address.

27. The apparatus of claim 17, wherein the address translation table is stored on the computing system.

28. The apparatus of claim 17, wherein the address translation table is stored on a device arranged to perform a direct memory access or remote direct memory access request to the computing system.

\* \* \* \* \*